United States Patent
Kong

(10) Patent No.: US 9,483,148 B2
(45) Date of Patent: Nov. 1, 2016

(54) METHOD FOR MANUFACTURING TOUCH SUBSTRATE

(71) Applicants: Shanghai Tianma Micro-Electronics Co., Ltd., Shanghai (CN); Tianma Micro-Electronics Co., Ltd., Shenzhen, Guangdong Province (CN)

(72) Inventor: Xiangjian Kong, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/302,993

(22) Filed: Jun. 12, 2014

(65) Prior Publication Data
US 2015/0185904 A1    Jul. 2, 2015

(30) Foreign Application Priority Data
Dec. 30, 2013  (CN) .......................... 2013 1 0747157

(51) Int. Cl.
| C03C 15/00 | (2006.01) |
| C03C 25/68 | (2006.01) |
| C23F 1/00  | (2006.01) |
| G06F 3/044 | (2006.01) |

(52) U.S. Cl.
CPC ..... *G06F 3/044* (2013.01); *G06F 2203/04103* (2013.01)

(58) Field of Classification Search
CPC ..................... G06F 2203/04103; G06F 3/044
USPC .............................................. 216/6
See application file for complete search history.

(56) References Cited

U.S. PATENT DOCUMENTS

| 3,906,515 | A  | * | 9/1975 | Hosokoshi | H01J 9/2272 396/547 |
| 4,228,459 | A  | * | 10/1980 | Smith | H04N 5/14 348/163 |
| 4,282,173 | A  | * | 8/1981 | Ochiai | C04B 38/065 156/168 |
| 7,274,424 | B1 | * | 9/2007 | Kurihara | G02F 1/13338 345/173 |
| 2002/0063811 | A1 | * | 5/2002 | Ahn | G02F 1/13439 349/43 |
| 2013/0286300 | A1 | * | 10/2013 | Lee | G02F 1/13306 349/12 |
| 2013/0307820 | A1 | * | 11/2013 | Kim | G06F 3/0412 345/174 |

FOREIGN PATENT DOCUMENTS

CN        103034357 A    4/2013

* cited by examiner

*Primary Examiner* — Thomas Pham
(74) *Attorney, Agent, or Firm* — Alston & Bird LLP

(57) ABSTRACT

A method of manufacturing a touch substrate is disclosed. The method includes forming a shading layer on one lateral surface of a base substrate, forming a first transparent conductive film on the other lateral surface of the base substrate, and forming the first conductive film into an auxiliary lead layer with a patterning process using the shading layer as a mask pattern. The method also includes forming a driving electrode on the base substrate, and forming a sensing electrode on the base substrate.

8 Claims, 6 Drawing Sheets

METHOD FOR MANUFACTURING TOUCH SUBSTRATE

CROSS-REFERENCES TO RELATED APPLICATIONS

This application claims the benefit of priority to Chinese Patent Application No. 201310747157.6 filed with the Chinese Patent Office on Dec. 30, 2013 and titled "METHOD FOR MANUFACTURING TOUCH SUBSTRATE", the content of which is incorporated herein by reference in its entirety.

TECHNICAL FIELD

The present invention relates to the technical field of touch screens, and particularly to a method for manufacturing a touch substrate.

BACKGROUND OF THE INVENTION

At present, touch display screens have become a future development trend. A touch electrode of a capacitive touch display screen includes a sensing electrode and a driving electrode, and the sensing electrode and the driving electrode are generally wide (for example, the sensing electrode and the driving electrode cover a pixel open area) to ensure a sensing effect on a touch action.

The sensing electrode and the driving electrode have some resistance, and touch sensitivity may be improved by reducing the resistance of the sensing electrode and the driving electrode, for example, the resistance of the sensing electrode and the driving electrode may be reduced by increasing thicknesses thereof under the condition that widths of the sensing electrode and the driving electrode are not changed, or reduced by increasing the widths thereof under the condition that the thicknesses of the sensing electrode and the driving electrode are not changed. However, the widths of the sensing electrode and the driving electrode can not be randomly changed, otherwise, the touch effect is affected. When the resistance of the sensing electrode and the driving electrode is reduced by increasing the thicknesses of the sensing electrode and the driving electrode, because the sensing electrode and the driving electrode cover the pixel open area, transmittance of a capacitive touch display screen may not meet the requirement. To solve the above problems, auxiliary leads are added below the sensing electrode and/or the driving electrode in the prior art, and a plurality of auxiliary leads form an auxiliary lead layer; and the auxiliary leads are connected in parallel with the sensing electrode and/or the driving electrode, so that the resistance of the sensing electrode and/or the driving electrode is reduced.

However, there may be alignment errors when the auxiliary leads are etched. In order to prevent the pixel open area being covered by wide auxiliary leads to affect the transmittance of the capacitive touch display screen, the widths of the auxiliary leads can only be made to be smaller than the width of a shading layer. There is some difference between the widths of the auxiliary leads obtained by this method and the width of the pattern of the shading layer, so that the effect of reducing the resistance of the sensing electrode and/or the driving electrode is not ideal, and the touch sensitivity of the capacitive touch display screen can not be well improved

BRIEF SUMMARY OF THE INVENTION

One inventive aspect is a method of manufacturing a touch substrate. The method includes forming a shading layer on one lateral surface of a base substrate, forming a first transparent conductive film on the other lateral surface of the base substrate, and forming the first conductive film into an auxiliary lead layer with a patterning process using the shading layer as a mask pattern. The method also includes forming a driving electrode on the base substrate, and forming a sensing electrode on the base substrate.

DETAILED DESCRIPTION OF THE PREFERRED EMBODIMENTS

The implementation processes of the embodiments of the present invention will be illustrated in detail below in conjunction with the accompanying drawings of the description. It should be noted that the same or similar reference numbers express the same or similar components or components with the same or similar functions throughout. The embodiments described with reference to the accompanying drawings below are exemplary, and are merely used for interpreting the present invention, rather than limiting the present invention.

Figure 1:
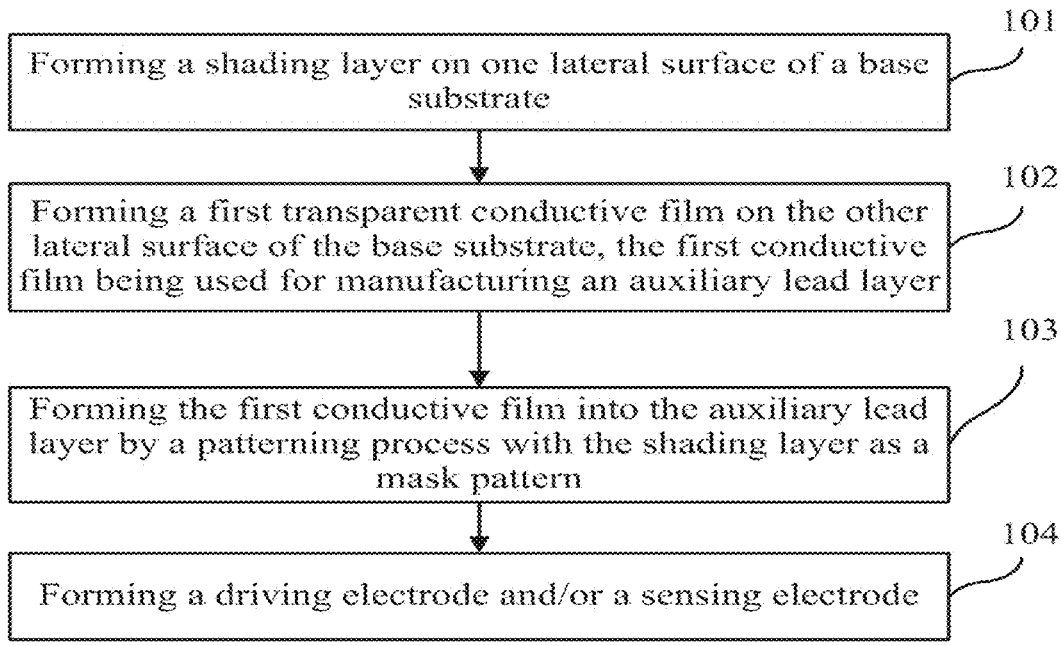
FIG. 1 is a flow diagram of a method for manufacturing a touch substrate according to an embodiment of the present invention.

With reference to FIG. 1, an embodiment of the present invention provides a method for manufacturing a touch substrate, the method is used to form a driving electrode and a sensing electrode on a base substrate. The method includes the following steps.

101, forming a shading layer on one lateral surface of the base substrate.

Generally, the shading layer is arranged on one lateral surface of the substrate. The base substrate is generally a glass substrate for manufacturing a color filter substrate, and the shading layer may be located on one lateral surface of the base substrate close to liquid crystals or located on a viewing side. When the color filter substrate provided with the shading layer and an array substrate are oppositely arranged to form a liquid crystal box, the shading layer is used for shading metal leads such as data lines, gate lines, common electrode lines and/or the like on the array substrate. In this embodiment, the shading layer is preferably arranged on one lateral surface close to the liquid crystals.

Preferably, the shading layer is a black matrix.

102, forming a first transparent conductive film on the other lateral surface of the base substrate, wherein the first conductive film is used for manufacturing an auxiliary lead layer.

It should be noted that, in order to well reduce the resistance of the driving electrode and/or the sensing electrode after auxiliary leads formed by the first conductive film are connected in parallel with the driving electrode and/or the sensing electrode, the resistance of the material of the first conductive film is smaller than or equal to resistance of the materials of the driving electrode and the sensing electrode. Preferably, the material of the first conductive film is a material of a low-resistance transparent conductive film (TCF).

The material of the low-resistance TCF may be, for example, indium tin oxide (ITO), aluminum zinc oxide (AZO) or gallium zinc oxide (GZO).

The above materials of low-resistance TCF are merely for illustrating this embodiment, rather than limiting the present invention.

103, forming the first conductive film into the auxiliary lead layer by a patterning process with the shading layer as a mask pattern, wherein a width of a pattern on the auxiliary lead layer is the same as that of a pattern on the shading layer.

It should be understood that the formed auxiliary lead layer is provided with a plurality of auxiliary leads, and the width of the pattern of the auxiliary lead layer is the widths of the auxiliary leads. Meanwhile, the shading layer includes a plurality of shading strips, and the width of the pattern on the shading layer is the widths of the shading strips.

Figure 2:
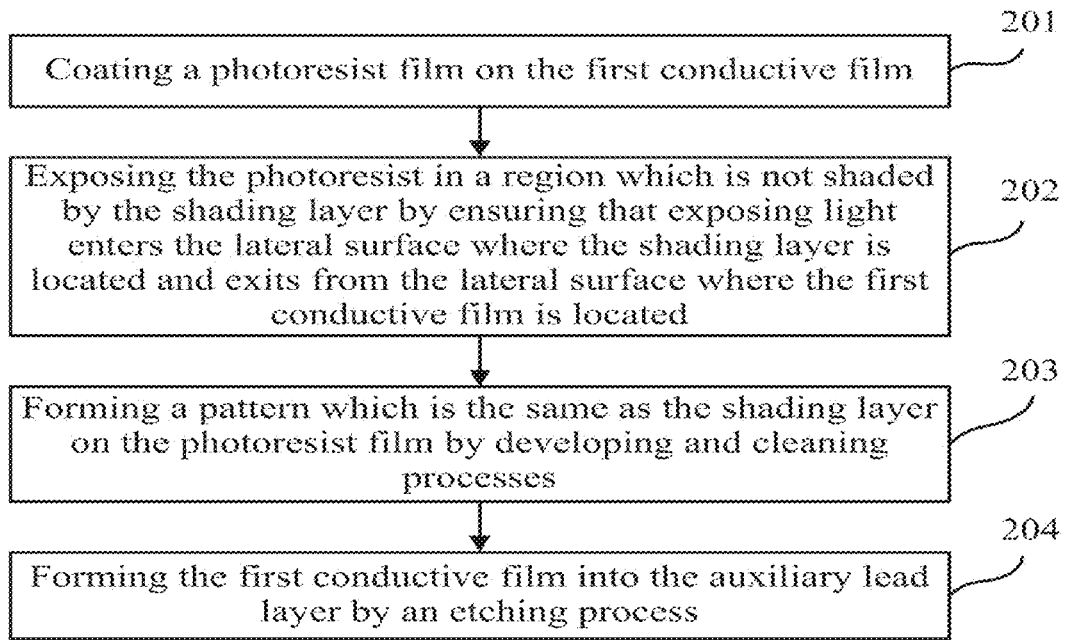
FIG. 2 is a flow diagram of forming a first conductive film into an auxiliary lead layer by a patterning process with a shading layer as a mask pattern according to an embodiment of the present invention.

As shown in FIG. 2, the first conductive film is formed into the auxiliary lead layer by a patterning process with the shading layer as the mask pattern, specifically including:

201, coating a photoresist film on the first conductive film.

202, exposing the photoresist film in a region which is not shaded by the shading layer by ensuring that exposing light enters the lateral surface where the shading layer is located and exits from the lateral surface where the first conductive film is located.

In this step, due to the opaqueness of the shading layer, when the exposing light enters the lateral surface where the shading layer is located, a region shaded by the shading layer is not irradiated by the exposing light, and the region which is not shaded by the shading layer is irradiated by the exposing light, so that the shading layer is used as the mask pattern.

203, forming a pattern which is the same as the shading layer on the photoresist film by developing and cleaning processes.

204, forming the first conductive film into the auxiliary lead layer by an etching process.

Preferably, the photoresist film is made of positive photoresist. In this embodiment, the photoresist film is patterned by the light through the first transparent conductive film in the following exposure process by adopting the positive photoresist, so that the part beyond the photoresist film to be reserved becomes the positive photoresist.

By using the shading layer as the mask pattern, the width of the pattern of the auxiliary lead layer, which is roughly or completely the same as the width of the pattern of the shading layer, may be obtained, that is, the widths of the auxiliary leads are roughly or completely the same as the widths of the shading strips.

In this embodiment, the shading layer is used as the mask pattern, so that on one hand, a mask does not need to be provided additionally, and the auxiliary leads which are the same as the pattern of the shading layer in position and roughly or completely the same as the pattern of the shading layer in width may be obtained through one-time exposure, development and etching processes by using the shading layer for self-alignment and limitation of the widths of the auxiliary leads; and on the other hand, it does not need to be considered that the widths of the auxiliary leads exceed the width of the pattern of the shading layer, and the widths of the auxiliary leads can be maximally.

104, forming the driving electrode and/or the sensing electrode on the base substrate on which step 103 has been completed.

Only the driving electrode, only the sensing electrode or both the driving electrode and the sensing electrode may be formed on the base substrate on which the auxiliary lead layer is formed.

For example, only the driving electrode is formed on the base substrate on which the auxiliary lead layer is formed, that is, the auxiliary leads are only in direct contact with the driving electrode, so that the resistance of the driving electrode is reduced in a parallel connection manner.

Preferably, the step of forming the driving electrode and the sensing electrode includes:
forming a second conductive film on the auxiliary lead layer, and forming the second conductive film only into the driving electrode by a patterning process, the driving electrode being in direct contact with the auxiliary lead layer;
removing a region of the auxiliary lead layer, which is not covered by the driving electrode, by an etching process;
forming the sensing electrode on the base substrate on which the above-mentioned steps are completed, the driving electrode and the sensing electrode being located on different layers and insulated from each other.

In this embodiment, the width of the formed driving electrode in direct contact with the auxiliary lead layer may exceed the widths of the auxiliary leads of the auxiliary lead layer, and the thickness of the part of the driving electrode exceeding the auxiliary leads is smaller than a sum of the thickness of the driving electrode and the thicknesses of the auxiliary leads, so that the part of the driving electrode exceeding the auxiliary leads does not affect the transmittance, and the object of reducing the resistance of the driving electrode is fulfilled by parallel connection between the driving electrode and the auxiliary leads. Meanwhile, the widths of the auxiliary leads are maximized, that is, the widths of the auxiliary leads are roughly or completely the same as the width of the pattern of the shading layer, and the resistance of the driving electrode may be furthest reduced by parallel connection of the driving electrode and the auxiliary leads.

For another example, only the sensing electrode is formed on the base substrate on which the auxiliary lead layer is formed, that is, the auxiliary leads are only in direct contact with the sensing electrode, so that the resistance of the sensing electrode is reduced in a parallel connection manner.

Preferably, the step of forming the driving electrode and the sensing electrode includes:

forming a second conductive film on the auxiliary lead layer, and forming the second conductive film only into the sensing electrode by a patterning process, the sensing electrode being in direct contact with the auxiliary lead layer;

removing a region of the auxiliary lead layer, which is not covered by the sensing electrode, by an etching process;

forming the driving electrode on the base substrate on which the above-mentioned steps are completed, the driving electrode and the sensing electrode being located on different layers and insulated from each other.

In this embodiment, the width of the formed sensing electrode in direct contact with the auxiliary lead layer may exceed the widths of the auxiliary leads of the auxiliary lead layer, and the thickness of the part of the sensing electrode exceeding the auxiliary leads is smaller than a sum of the thickness of the sensing electrode and the thicknesses of the auxiliary leads, so that the part of the sensing electrode exceeding the auxiliary leads does not affect the transmittance, and the object of reducing the resistance of the sensing electrode is fulfilled by parallel connection of the sensing electrode and the auxiliary leads. Meanwhile, the widths of the auxiliary leads are maximized, that is, the widths of the auxiliary leads are roughly or completely the same as the width of the pattern of the shading layer, and the resistance of the sensing electrode may be furthest reduced by parallel connection of the sensing electrode and the auxiliary leads.

For another example, the driving electrode and the sensing electrode are formed on the base substrate on which the auxiliary lead layer is formed, that is, the auxiliary leads are in direct contact with the driving electrode and the sensing electrode, so that the resistance of the driving electrode and the sensing electrode is reduced in a parallel connection manner.

Preferably, the step of forming the driving electrode and the sensing electrode includes:

forming a second conductive film on the auxiliary lead layer, and forming the second conductive film into the driving electrode and the sensing electrode by a patterning process;

removing a region of the auxiliary lead layer, which is not covered by the driving electrode and the sensing electrode, by an etching process, the driving electrode and the sensing electrode being located on a same layer and insulated from each other.

In this embodiment, the widths of the formed driving electrode and sensing electrode in direct contact with the auxiliary lead layer may exceed the widths of the auxiliary leads of the auxiliary lead layer, and the thickness of the parts of the driving electrode and the sensing electrode exceeding the auxiliary leads is smaller than a sum of the thicknesses of the driving electrode and the sensing electrode and the thicknesses of the auxiliary leads, so that the parts of the driving electrode and the sensing electrode exceeding the auxiliary leads do not affect the transmittance, and the object of reducing the resistance of the driving electrode and the sensing electrode is fulfilled by parallel connection of the driving electrodes and the sensing electrodes and the auxiliary leads. Meanwhile, the widths of the auxiliary leads are maximized, that is, the widths of the auxiliary leads are roughly or completely the same as the width of the pattern of the shading layer, and the resistance of the driving electrode and the sensing electrode may be furthest reduced by parallel connection of the driving electrodes and the sensing electrodes and the auxiliary leads. Certainly, under such situation, insulation at the intersection of the driving electrode and the sensing electrode needs to be considered, which is not described redundantly herein.

The embodiment of the present invention has the following beneficial effects: the shading layer and the auxiliary leads are formed on different lateral surfaces of the base substrate, and the auxiliary leads are manufactured by using the shading layer as the mask pattern, so that the widths of the auxiliary leads are the same as the width of the shading layer. The auxiliary leads are connected in parallel with the sensing electrode and/or the driving electrode, so that the resistance of the sensing electrode and/or the driving electrode is reduced, and the touch sensitivity of a capacitive touch display screen is improved.

To illustrate the embodiments of the present invention more clearly, the manufacturing of the auxiliary lead layer and a structure of the auxiliary lead layer with a touch electrode formed thereon will be illustrated below in conjunction with FIGS. 3 to 9.

From FIG. 3 to FIG. 10, the respective reference numbers have the same meaning.

Figure 3:
FIG. 3 is a schematic diagram of forming a shading layer 2 on one lateral surface of a base substrate 1 according to an embodiment of the present invention.

FIG. 3 shows a schematic diagram of forming a shading layer 2 on one lateral surface of a base substrate 1.

Figure 4:
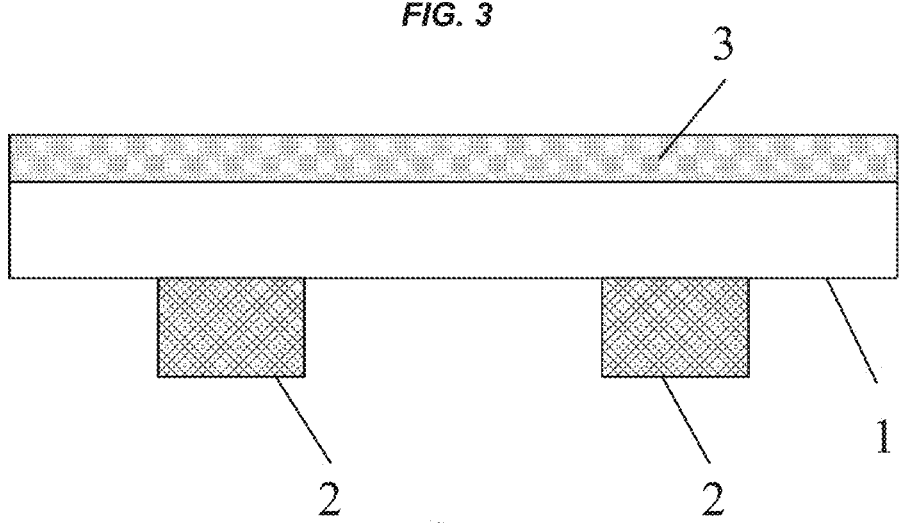
FIG. 4 is a schematic diagram of forming a first conductive film 3 on the other lateral surface of the base substrate 1 according to an embodiment of the present invention.

FIG. 4 shows a schematic diagram of forming a first conductive film 3 on the other lateral surface of the base substrate 1.

Preferably, the material of the first conductive film 3 is a material of a low-resistance transparent conductive film. The material of the transparent conductive film may be any one of indium tin oxide, aluminum zinc oxide and gallium zinc oxide.

Figure 5:
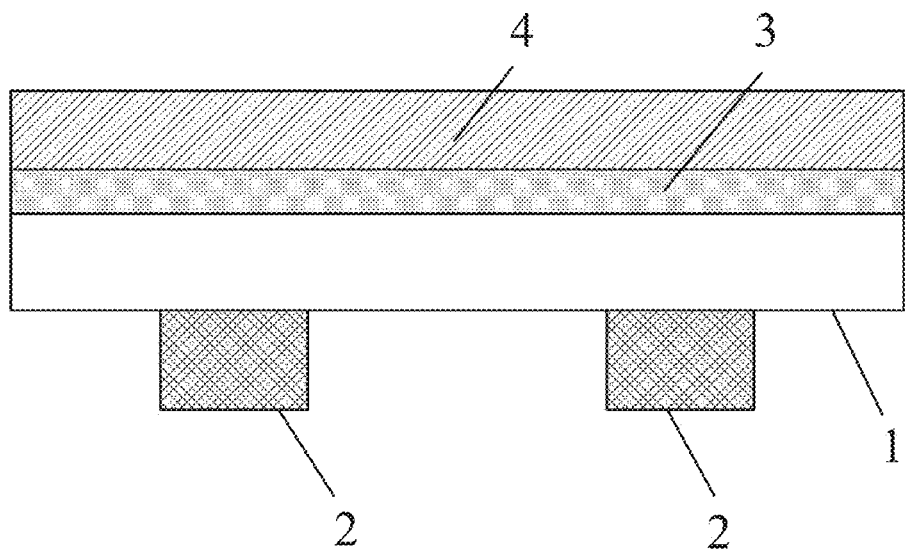
FIG. 5 is a schematic diagram of coating a photoresist film 4 on the first conductive film 3 according to an embodiment of the present invention.

FIG. 5 shows a schematic diagram of coating a photoresist film 4 on the first conductive film 3. The photoresist is positive photoresist.

Figure 6:
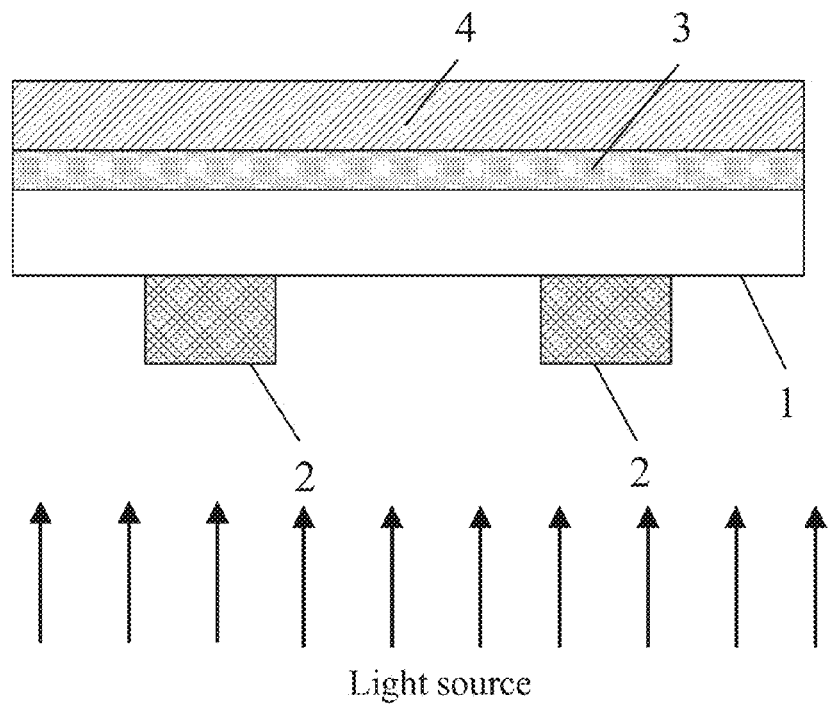
FIG. 6 is a schematic diagram of exposing the photoresist film 4 shown in FIG. 5 by using the shading layer 2 as a mask pattern according to an embodiment of the present invention.

FIG. 6 shows a schematic diagram of exposing the photoresist film 4 shown in FIG. 5 by using the shading layer 2 as a mask pattern.

Figure 7:
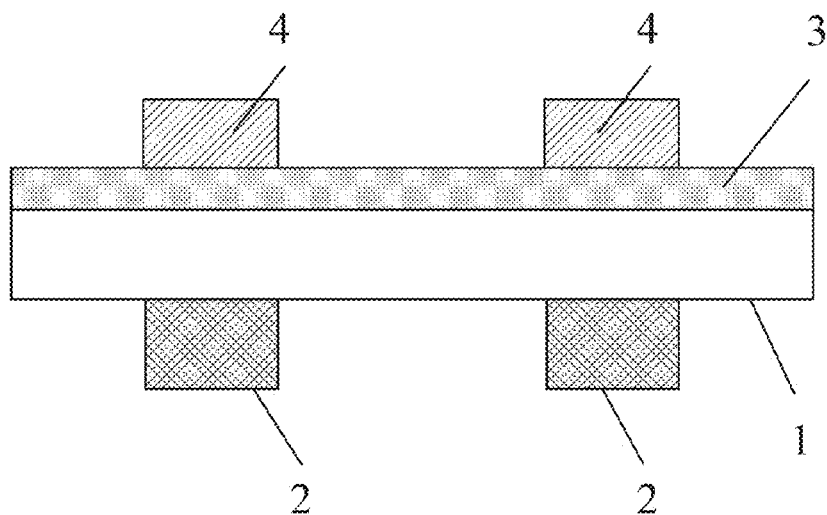
FIG. 7 is a schematic diagram of forming a same pattern as the shading layer 2 on the photoresist film 4 according to an embodiment of the present invention.

FIG. 7 shows a schematic diagram of forming a same pattern as the shading layer 2 on the photoresist film 4.

Figure 8:
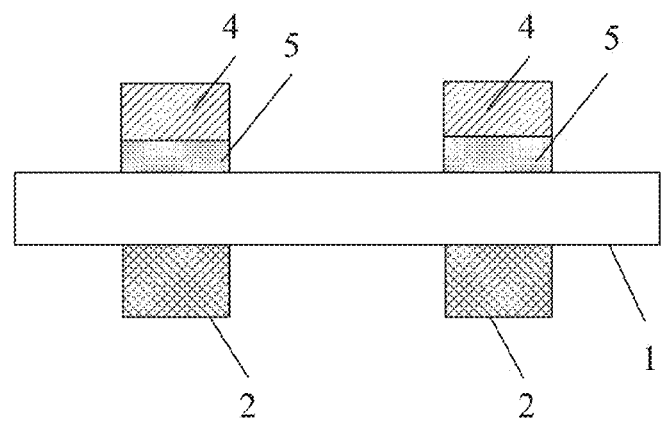
FIG. 8 is a schematic diagram of forming an auxiliary lead layer 5 on the first conductive film shown in FIG. 7 according to an embodiment of the present invention.

FIG. 8 shows a schematic diagram of forming an auxiliary lead layer 5 on the first conductive film shown in FIG. 7.

Figure 9:
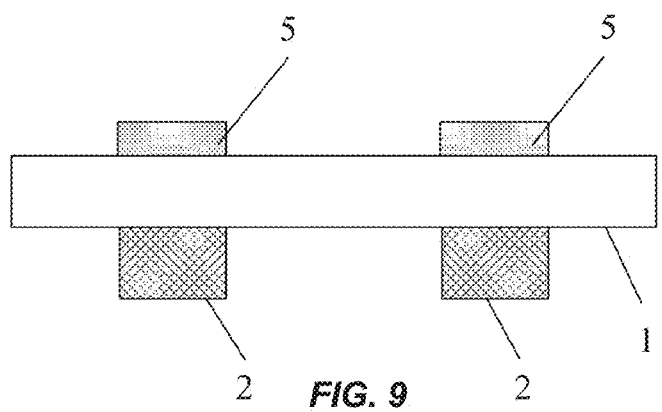
FIG. 9 is a schematic diagram of the auxiliary lead layer 5 after the photoresist film 4 is removed according to an embodiment of the present invention.

FIG. 9 shows a schematic diagram of the auxiliary lead layer 5 after the residual photoresist film 4 is removed, wherein, the shading layer 2 is formed on one lateral surface of the base substrate, the auxiliary lead layer 5 is formed on the other lateral surface of the base substrate, and the width of the pattern of the auxiliary lead layer 5 is the same as that of the pattern of the shading layer 2.

Figure 10:
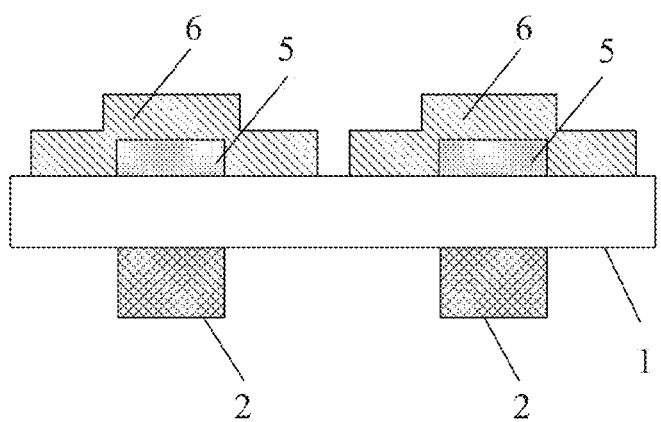
FIG. 10 is a schematic diagram of forming a touch electrode 6 on the auxiliary lead layer 5 according to an embodiment of the present invention.

To understand the auxiliary lead layer 5 and the driving electrode and/or the sensing electrode according to the embodiments of the present invention more clearly and more easily, FIG. 10 shows a schematic diagram of forming a touch electrode 6 on the auxiliary lead layer 5, wherein, the touch electrode 6 may be the driving electrode and/or the sensing electrode. The width of the pattern of the auxiliary lead layer 5 is the same as that of the pattern of the shading layer 2, and the width of the touch electrode 6 is greater than that of the pattern of the auxiliary lead layer 5.

To obtain the touch electrode 6 shown in FIG. 10, the following steps for manufacturing the touch electrode 6 should further be included in conjunction with FIG. 3 to FIG. 9.

Figure 11:
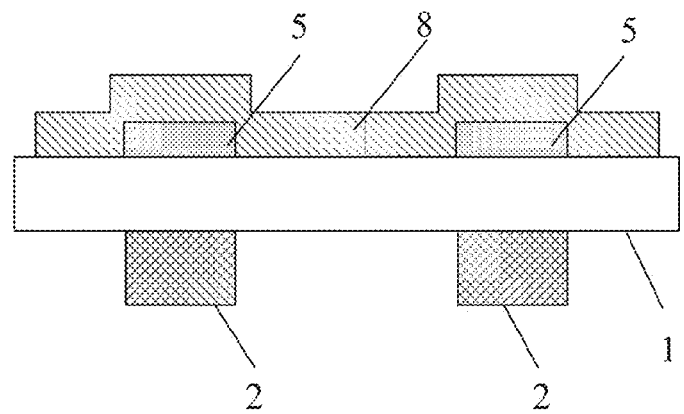
FIG. 11 is a schematic diagram of coating a transparent conductive film on the auxiliary lead layer 5 shown in FIG. 9 according to an embodiment of the present invention.

Step 1, coating a transparent conductive film 8 on the auxiliary lead layer 5 shown in FIG. 9, as shown in FIG. 11. The transparent conductive film 8 is used for forming the touch electrode 6 shown in FIG. 10, and the material of the transparent conductive film 8 may be any one of indium tin oxide, aluminum zinc oxide and gallium zinc oxide.

Figure 12:
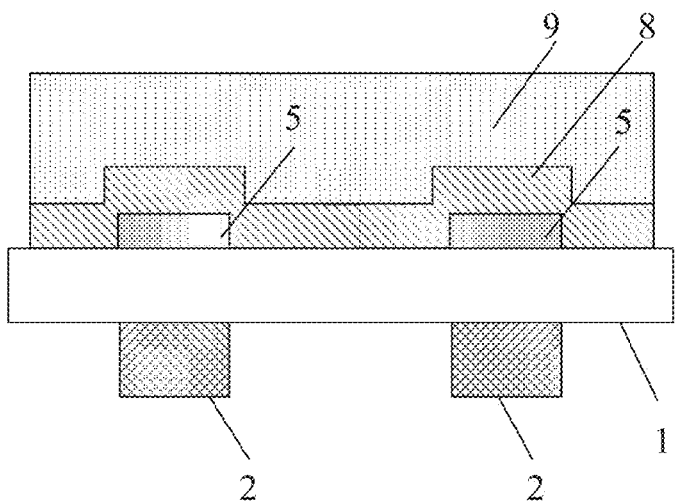
FIG. 12 is a schematic diagram of forming a photoresist film 9 on the transparent conductive film 8 according to an embodiment of the present invention.

Step 2, forming a photoresist film 9 on the transparent conductive film 8, as shown in FIG. 12.

Figure 13:
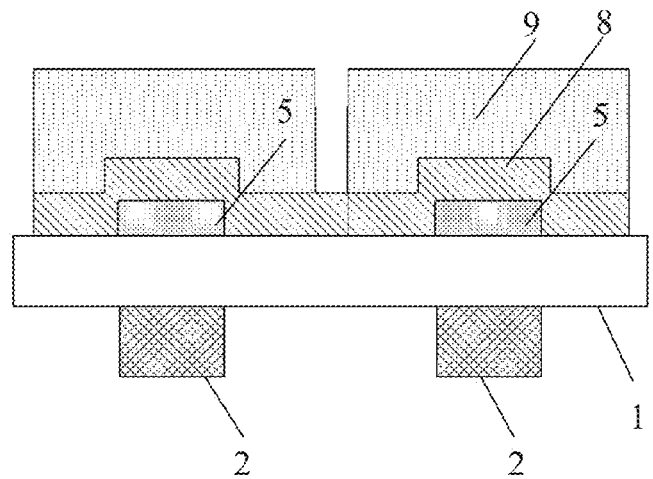
FIG. 13 is a schematic diagram of forming the photoresist film 9 into the pattern of the touch electrode 6 by a patterning process according to an embodiment of the present invention.

Step 3, forming the photoresist film 9 into a pattern of the touch electrode 6 by a patterning process, as shown in FIG. 13.

Figure 14:
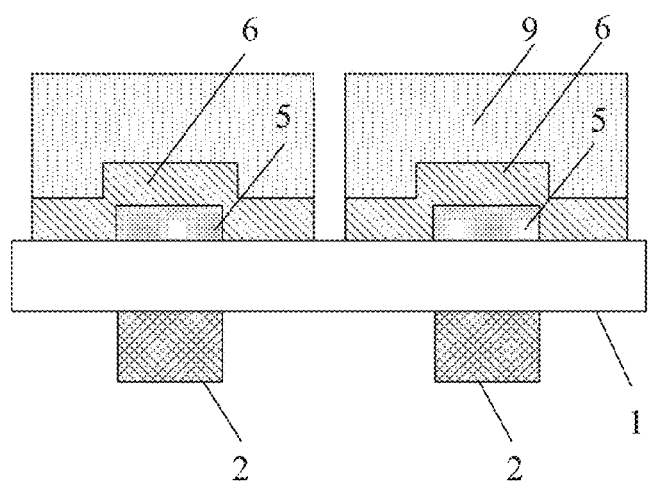
FIG. 14 is a schematic diagram of etching off the transparent conductive film 8 in a region, which is not shaded by the photoresist film 9, to form the pattern of the touch electrode 6 by a patterning process according to an embodiment of the present invention.

Step 4, etching off a region of the transparent conductive film 8, which is not shaded by the photoresist film 9, by a patterning process to form the pattern of the touch electrode 6, as shown in FIG. 14.

Step 5, further etching the auxiliary lead layer 5 which is not covered by the touch electrode 6 by an etching process to obtain a final auxiliary lead layer.

Step 6, forming the touch electrode 6 shown in FIG. 10 after the residual photoresist is removed, wherein the touch electrode 6 is in direct contact with the auxiliary lead layer 5.

The above patterning process may include one or more of exposure, development, etching and cleaning, and different patterning processes may be selected as needs.

Obviously, various modifications and variations could be made to the present invention by those skilled in the art without departing from the spirit and scope of the present invention. Thus, provided that these modifications and variations made to the present invention are within the scope of the claims of the present invention and equivalent technologies thereof, the present invention is intended to cover these modifications and variations.

What is claimed is:

1. A method of manufacturing a touch substrate, the method comprising:
    forming a shading layer on a first lateral surface of a base substrate, wherein the base substrate comprises the first lateral surface and a second lateral surface opposite to the first lateral surface; wherein the shading layer is a black matrix, the black matrix being used for light-shading for non-display area and used as mask;
    forming a first transparent conductive film on the second lateral surface of the base substrate;
    forming a photoresist film on the first transparent conductive film, then exposing the photoresist film by using the shading layer as a mask pattern, and forming the first transparent conductive film into an auxiliary lead layer;
    forming a driving electrode on the base substrate; and
    forming a sensing electrode on the base substrate.

2. The method of claim 1, wherein a width of a pattern on the auxiliary lead layer is substantially the same as that of a pattern on the shading layer.

3. The method of claim 2, wherein forming the driving electrode and the sensing electrode comprises:
    forming a second conductive film on the auxiliary lead layer;
    forming the second conductive film into the driving electrode by a patterning process, the driving electrode being in direct contact with the auxiliary lead layer;
    removing a region of the auxiliary lead layer, which is not covered by the driving electrode, by an etching process; and
    forming the sensing electrode on the base substrate, the driving electrode and the sensing electrode being located on different layers and insulated from each other.

4. The method of claim 1, wherein the exposing the photoresist film and forming the first transparent conductive film into the auxiliary lead layer comprises:
    exposing the photoresist film in a region which is not shaded by the shading layer with light entering the lateral surface where the shading layer is located and exiting from the lateral surface where the first transparent conductive film is located;
    forming a pattern which is substantially the same as the shading layer on the photoresist film by developing and cleaning processes; and
    forming the first transparent conductive film into the auxiliary lead layer by an etching process.

5. The method of claim 4, wherein forming the driving electrode and the sensing electrode comprises:
    forming a second conductive film on the auxiliary lead layer;
    forming the second conductive film into the driving electrode by a patterning process, the driving electrode being in direct contact with the auxiliary lead layer;
    removing a region of the auxiliary lead layer, which is not covered by the driving electrode, by an etching process; and
    forming the sensing electrode on the base substrate, the driving electrode and the sensing electrode being located on different layers and insulated from each other.

6. The method of claim 1, wherein forming the driving electrode and the sensing electrode comprises:
    forming a second conductive film on the auxiliary lead layer;
    forming the second conductive film into the driving electrode by a patterning process, the driving electrode being in direct contact with the auxiliary lead layer;
    removing a region of the auxiliary lead layer, which is not covered by the driving electrode, by an etching process; and
    forming the sensing electrode on the base substrate, the driving electrode and the sensing electrode being located on different layers and insulated from each other.

7. The method of claim 1, wherein the photoresist film comprises positive photoresist.

8. The method of claim 1, wherein a material of the first transparent conductive film is any one of indium tin oxide, aluminum zinc oxide and gallium zinc oxide.

* * * * *